United States Patent [19]
Berg et al.

[11] Patent Number: 5,891,937
[45] Date of Patent: Apr. 6, 1999

[54] AGRICULTURE RESIDUE BASED ABSORBENT MATERIAL AND METHOD FOR MANUFACTURE

[75] Inventors: Larry E. Berg, Wanamingo; Brian K. Brashaw, Duluth; Chris F. Edwardson, Duluth; Roy D. Adams, Duluth; Robert J. Vatalaro, Duluth, all of Minn.

[73] Assignee: Regents of the University of Minnesota, Minneapolis, Minn.

[21] Appl. No.: 614,954

[22] Filed: Mar. 11, 1996

Related U.S. Application Data

[63] Continuation of Ser. No. 349,053, Dec. 2, 1994, abandoned.

[51] Int. Cl.$^6$ .......................... C08L 97/02; C08K 11/00; B32B 31/20
[52] U.S. Cl. ............................. 524/13; 524/14; 524/15; 524/18; 524/25; 524/35; 524/47; 428/221; 428/224; 428/243; 428/393; 428/394; 428/503
[58] Field of Search ................................ 524/13, 14, 15, 524/18, 25, 35, 47; 428/221, 224, 243, 393, 394, 503

[56] References Cited

U.S. PATENT DOCUMENTS

| | | | |
|---|---|---|---|
| 3,617,564 | 11/1971 | Vander Hooven | 210/40 |
| 3,888,766 | 6/1975 | De Young | 521/905 |
| 4,053,112 | 10/1977 | Vander Hooven | 241/24 |
| 4,058,124 | 11/1977 | Yen et al. | 524/13 |
| 4,497,712 | 2/1985 | Cowling | 210/691 |
| 4,647,617 | 3/1987 | Saotome | 524/13 |
| 4,659,478 | 4/1987 | Stapelfeld | 210/690 |
| 4,883,021 | 11/1989 | Ducharme | 119/1 |
| 4,969,774 | 11/1990 | Arseneault | 405/60 |
| 5,017,319 | 5/1991 | Shen | 264/129 |
| 5,062,954 | 11/1991 | Leedy | 210/502.1 |
| 5,160,629 | 11/1992 | Brown | 210/671 |
| 5,374,670 | 12/1994 | Ayorinde et al. | 524/13 |
| 5,382,610 | 1/1995 | Harada et al. | 524/13 |

FOREIGN PATENT DOCUMENTS

| | | | |
|---|---|---|---|
| 52-148493 | 12/1977 | Japan . | |
| 9008806 | 8/1990 | WIPO | 524/13 |

*Primary Examiner*—James J. Seidleck
*Assistant Examiner*—Olga Asinovsky
*Attorney, Agent, or Firm*—Schwegman, Lundberg, Woessner & Kluth, P.A.

[57] ABSTRACT

An absorbent agriculture residue product and method of making the product. Preferably the agriculture residue material is reduced in size, adhesive added, consolidated to form panels or other shapes and heated to cure the adhesive. Preferably, the agriculture material is reduced in size from less than about 2 inches and the adhesive is present in an amount ranging from between about 2% to about 20% by dry weight. The products possess good absorption characteristics, durability and the ability to retain absorbed liquids upon application of pressure to saturated panels.

18 Claims, No Drawings

AGRICULTURE RESIDUE BASED ABSORBENT MATERIAL AND METHOD FOR MANUFACTURE

This is a continuation application of U.S. Ser. No. 08/349,053 filed Dec. 2, 1994, which is hereby abandoned.

BACKGROUND OF THE INVENTION

1. Field of the Invention

This invention relates to agriculture residue based panel or compressed shape materials, such as an absorbent panel or environmentally safe nursery pots. Agriculture residues include, but are not limited to, corn residues, wheat straw, rye, barley, prairie grasses, alfalfa straw, or flax straw. More particularly, this invention relates to corn residues which are processed and admixed with a variety of adhesive materials to provide materials which encompass multiple consumer uses.

2. Description of the Prior Art

It is well known that cellulose fibers are good absorbents for soluble oils, water and water based fluids and even heavy oils.

Clay products have been widely used as absorbents, but present problems both in dispersion and disposal upon usage in hazardous waste clean up, including oil spills. Clay products typically are supplied in granular form and thus are difficult to control upon dispersion on an oil spill area and are also difficult to collect and dispose of once the clean up has completed. The introduction of cellulose based products has added BTU value to the sorbent product, thus adding avenues of disposal of the spent sorbent material by incineration.

Readily available plant celluloses such as wood and rice hulls reduced to a powder can be processed into absorbent products. Processing corn cobs to produce an absorbent material is also known.

U.S. Pat. No. 3,617,564 to Vander Hooven, describes "a method for removing oil or oily substances from the surface or upper layer of a body of water, comprising spreading an absorbent, consisting essentially of corn cob components, excluding all but trace amounts of the woody ring component" upon the oil. Vander Hooven is directed to corn cob component separation such that the lighter cob components are then spread on the water surface without danger of absorbing great amounts of water and then sinking beneath the water's surface after also absorbing hazardous materials.

U.S. Pat. No. 4,497,712 to Cowling discloses "a pillow" which contains corn cobs, having an absorption capacity in excess of 300% to 500%, and which have been ground into granules. The granules in Cowling must also be light weight, such as 14 lbs. per cubic foot so that the pillow will float when saturated. Thus, Cowling necessarily requires that woody ring separation in order to form a light weight absorbent material.

U.S. Pat. No. 5,062,954 to Leedy et al. discloses a cellulose based product and method of manufacture, wherein the cellulose source is corn cob components. Specifically, Leedy requires the use of the corn cob lighter components of chaff and pith, which must be separated from the hard woody ring. The absorbent material in Leedy can contain no more than about 5% of the woody ring, which comprises up to about 60% of corn cob weight. Further, Leedy requires processing of the light corn cob components to a particle size preferably in the range between a number 10 screen and a number 60 screen size.

U.S. Pat. No. 5,160,629 to Brown discloses method for using entire corn cobs for absorbing oil spills, such that the cobs do not sink. Brown requires removal of all kernels from whole corn cobs, and preferably completely drying the corn cobs prior to application on an oil spill.

Further, composition boards known in the art such as particle board, oriented strand board, medium density fiber board and plywood are typically evaluated by mechanical characteristics such as static bending, evaluated as modulus of rupture and modulus of elasticity, internal bond, water absorption and thickness swell. However, no mention is made regarding board sorbency qualities.

SUMMARY OF THE INVENTION

The primary purpose of the development leading to the present invention was to generate products which utilize agriculture residue material as the fibrous material, without requiring separation of particular components with the use of specialized manufacturing equipment. Further, the product generated by the present invention possesses mechanical characteristics in addition to absorption qualities. The present invention utilizes all agriculture residues without regard to residue density for product performance. Thus, the present invention solves many problems found in the prior art because there is no requirement for component separation and utilizes agriculture residues which have previously been discarded as waste and produces an absorbent panel possessing specific mechanical properties.

Initially, corn residues are reduced in size to form particles ranging in size from particles which pass through a number 2 screen to those which are retained by a number 150 screen, i.e., particles which are 2 inch in size or smaller. The corn residue material includes, but is not limited to, corn stalks, husks, cobs and kernels. Size separation in this manner accounts for approximately 99% of the residue material originally supplied. Only very small particles which primarily are sand, silt and dirt, pass through the 150 screen and are not utilized in the present invention. An adhesive is added in an amount ranging from between about 5% to about 20% based on weight to the particles to form a pliable blend. The blend can now be formed into mats or compressed into desired shapes. These mats may be further formed into any desired shape commensurate with consumer use. The mats are then consolidated and the adhesive is cured which forms hard durable panel products which then can be shipped for consumer use. The panel surfaces can optionally be perforated or textured.

DESCRIPTION OF THE PREFERRED EMBODIMENTS

The general process of reducing corn residue size to form particles, adding an adhesive, consolidating mats, and curing the adhesive which can be directed to particular products which require certain characteristics. Such products include but are not limited to absorbent panels for both aqueous and organic solutions, fuel briquettes, plant pots, durable panels for construction, paper, substrate for imbedding wildlife food and botanical bedding material. The following examples illustrate, not limit, the products which utilize corn residue particles of the present invention.

Other features of the present invention and many of the attendant advantages of the present invention will be readily appreciated as the same becomes better understood by reference to the preferred embodiments when considered in connection with the accompanying claims.

EXAMPLE I

The following example illustrates the utilization of corn residues to produce an absorbent panel material which can either be used to absorb aqueous solutions or organic solutions such as oil based products and is durable enough to function as a fatigue panel. The corn residue comprised stalk material, which was processed in a hammer mill to obtain particles which were classified by size as falling in the class of particles which pass through a number 2 screen but which are retained by a number 150 screen, which accounted for approximately 99% of the initial corn residue material prior to processing. The present example utilizes particles which fall into three categories: (1) particles which pass through a number 8 screen; (2) particles which are retained by a number 8 screen; and (3) particles which pass through a number 2 screen. The initial moisture content of the corn residue was approximately 20%. The corn residue particles may either be further processed as indicated below or the moisture content may be reduced. Preferably, the moisture content is less than about 10% and may be as low as 1% moisture content. The particles were dried in a tube drier for less than 5 seconds to reduce the moisture content to between about 7% to about 8%.

An adhesive was admixed to the residue particles. The adhesive can either be a synthetic or a natural adhesive. The synthetic adhesive is selected from adhesives known in the art such as phenol-formaldehyde resins, phenol-resorcinol-formaldehyde resins, urea-formaldehyde resins, melamine resins, melamine-urea resins, isocyanate and polyurethane based resins, polyvinyl resin emulsions, thermosetting polyvinyl acetate emulsions, acrylics, polyesters and epoxy resins for example. The natural adhesive is selected from those known in the art, such as starch-based resins, soybean-based resins, lignin-based resins and casein-based resins.

The adhesive chosen for the present example should be capable of forming a water resistant bond. The present example preferably utilizes phenol-formaldehyde as the adhesive. Other resins can be utilized which produce a water resistant bond. The adhesive is present from about 2% to about 20% based on dry weight. Preferably, the adhesive is added from about 5% to about 8% by dry weight. In the instant example, phenol-formaldehyde was added at about 7% dry weight to the residue particles through a Model EL3 Coil Spinning Disk Atomizer. The atomizer was run at about 10,000–12,000 revolutions per minute for about 1 minute for a 10 pound batch and about 20 minutes for a 200 pound batch. The adhesive can also be added to the corn residue material by applying the adhesive through a spray nozzle or by dripping the adhesive on the corn residue particles and then tumbling the particles for particle contact to distribute the adhesive.

Mats can be formed into any desired dimension or shape. In the present example, mats were formed to a target size of about 27"×27"×1". Target densities were between 15 pounds per cubic foot (pcf) to about 40 pcf. The mat surfaces may be perforated or textured to create a patterned surface. The mats are consolidated to form panels under a predetermined pressure per square inch. The resin is cured at a temperature ranging from about 300 deg. F. to about 450 deg. F. for a time sufficient from between about 1 minute to about 30 minutes.

Consolidating the mats to form panels may be done simultaneously with curing the resin. This is accomplished by application of pressure to the curing mats for a time sufficient to achieve a predetermined panel density. In the instant example, pressure and heat were simultaneously applied to the formed mats at about 500 psi at about 380 deg. F. for about 30 seconds to form the final thickness, between about 0.75 inches to about 1.5 inches. Once the desired thickness was reached, the pressure was reduced to approximately 100 psi to maintain the target thickness until the adhesive is cured. This pressure is applied to the mats for a time sufficient to achieve the desired density (pounds per cubic foot), which ranges between approximately 15 pcf to about 40 pcf and to cure the resin. By example, pressure was applied for about 14 minutes to achieve a 20 pcf panel and applied for about 17 minutes to achieve a 30 pcf panel.

The relative mechanical characteristics were evaluated for each combination of density and particle mesh size based on the stiffness, measured by modulus of elasticity (MOE) in pounds per square inch (psi) and strength, measured by modulus of rupture (MOR) in pounds per square inch (psi). Further, board strength was determined by internal bond measure by pounds per square inch (psi). The following table summarizes the mechanical characteristics of panel material.

TABLE 1

| Target Density pounds/cubic foot | Particle Mesh Size No. 8 & 2 Screen | Internal Bond (IB) (psi) | Modulus of Elasticity (psi) | Modulus of Rupture |
|---|---|---|---|---|
| 15 | −2 | 4.8 | 16,800 | 100 |
| 20 | +8 | 0.6 | 47,200 | 60 |
| 30 | +8 | 1.7 | 101,000 | 220 |
| 20 | −8 | 1.2 | 47,600 | 65 |
| 30 | −8 | 2.0 | 126,000 | 279 |
| 20 | −2 | 1.6 | 102,100 | 153 |
| 30 | −2 | 1.0 | 95,100 | 161 |
| 40 | −8 | 3.9 | 273,500 | 694 |

[1]The classification of particle size was denoted by "+" for particles used which were retained by the Number 8 Mesh screen and "−" for particles used which passed through the Number 8 or Number 2 Mesh screen.

The stiffness, MOE, for each particle size generally doubled when the density of each group was increased from 20 pcf to 30 pcf, except for the "−2" screen grouping. As the density was increased to 40 pcf, the MOE increased to a level which approximated the stiffness of readily available particleboard. Further, the panels generally have a specific gravity from about 0.15 to about 0.65 and is preferably between about 0.15 to about 0.50, or about 10 to about 30 pounds per cubic foot.

Absorbency evaluations were performed on a matrix of mat samples with combinations of particle size and densities. Results of a two hour and a 24 hour swell and water absorption were obtained. The following table summarizes the results obtained for the combinations.

TABLE 2

| Target Density pounds/cubic food (pcf) | Particle Mesh Size No 8 & 2 Mesh to classify | Thickness Swell | | Water Absorption % | |
|---|---|---|---|---|---|
| | | 2 hours | 24 hours | 2 hours | 24 hours |
| 15 | −2 | 11.2 | 11.8 | 287.4 | 313.1 |

TABLE 2-continued

| Target Density pounds/cubic food (pcf) | Particle Mesh Size No 8 & 2 Mesh to classify | Thickness Swell 2 hours | Thickness Swell 24 hours | Water Absorption % 2 hours | Water Absorption % 24 hours |
|---|---|---|---|---|---|
| 20 | +8 | 45.2 | 46.3 | 183.0 | 213.5 |
| 30 | +8 | 34.2 | 48.0 | 132.5 | 152.6 |
| 20 | −8 | 28.6 | 30.8 | 223.8 | 254.1 |
| 30 | −8 | 32.7 | 37.4 | 144.6 | 162.9 |
| 20 | −2 | 26.6 | 29.1 | 194.4 | 229.3 |
| 30 | −2 | 32.0 | 39.2 | 140.2 | 171.0 |
| 40 | −8 | 37.3 | 45.1 | 90.5 | 117.7 |
| control particleboard | | | 12.0 | | 25.0 |

Generally, the 30 pcf panels had a higher thickness swell than the 20 pcf panels. While not being bound by theory, since the higher density panels have more corn residue material which is available for absorbing water. However, the lower density panels have more void space which increases the capacity for holding more water. Thus, the lower density panels generally absorbed more water than the higher density panels. Further, water can be squeezed from the panel, leaving a spongy material. However, there is no thickness swell with oil absorption by the panels, thus leaving a solid rigid panel.

These density/particle size combination panels were also subjected to a two hour oil soak evaluation, wherein the saturation capacities were calculated on a grams of oil absorbed per gram of panel material. The following table summarizes the two hour oil soak evaluation where 2 inch×2 inch size panels were placed in oil and weighed at 30 minutes, 60 minutes and 120 minutes after placement. The oil utilized in the evaluations is 40 wt motor oil.

TABLE 3

| | | Saturated Oil Capacity | | |
|---|---|---|---|---|
| Density (pcf) | Particle Mesh Size | 30 min. | 60 min | 120 min. |
| 15 | −2 | 2.02 | 2.06 | 2.06 |
| 20 | +8 | 1.34 | 1.35 | 1.40 |
| 30 | +8 | 0.68 | 0.70 | 0.71 |
| 20 | −8 | 1.49 | 1.50 | 1.51 |
| 30 | −8 | 0.71 | 0.78 | 0.79 |
| 20 | −2 | 1.60 | 1.62 | 1.63 |
| 30 | −2 | 0.72 | 0.74 | 0.74 |
| 40 | −8 | 0.31 | 0.39 | 0.44 |

[1]Grams of oil absorbed per gram of panel material for the time points.

Generally, the 15 pcf panels held more oil than the 20 pcf panels and the 20 pcf panels held more oil than the 30 pcf panels, with very small differences noted in the oil holding capacities of varying particle sizes. Further, the maximum oil holding capacities were reached after 30 minutes of exposure to the oil, with very small increases in absorption from 30 minutes to 120 minutes.

Since saturation values were reached at 30 minutes, oil saturation based on weight and volume were evaluated at 30 minutes absorption for the 8 combinations of density/particle size panels. The following table by 21 in total weight and volume absorbed by 21 inch×21 inch×1 inch panels.

TABLE 4

| Oil Capacity | 30 min. | | | |
|---|---|---|---|---|
| Density (pcf) | Particle Mesh Size | Saturated Oil Capacity[1] | Panel Weight Oil Capacity (grams) | Volume Oil (quarts)[2] |
| 15 | −2 | 2.06 | 3,640 | 4.5 |
| 20 | +8 | 1.34 | 2,910 | 3.5 |
| 30 | +8 | 0.68 | 2,205 | 2.7 |
| 20 | −8 | 1.49 | 3,263 | 4.0 |
| 30 | −8 | 0.71 | 2,293 | 2.8 |
| 20 | −2 | 1.60 | 3,175 | 3.8 |
| 30 | −2 | 0.72 | 2,337 | 2.8 |
| 40 | −8 | 0.31 | 1,323 | 1.6 |

[1]Grams of oil absorbed per gram of panel material.
[2]Total weight of oil absorbed was calculated and converted to a volume based on an oil weight of 7.28 pounds per gallon.

Generally, the 15 pcf panels were observed to have greater oil holding capacity than the either the 20 pcf panels or the 30 pcf panels; with the 20 pcf panel produced from the −8 mesh particle size also having a oil holding capacity. Further, the saturated heating value of the panels is approximately 10,000 BTU/pound and has a low ash content upon incineration, less than approximately 2% on a weight basis.

Oil absorption was increased by perforating the panel surface, wherein the perforations were made with two penny nails at about ⅓ inch spacing. Pattern surface patterns may also be accomplished by placing a patterned screen on a mat surface during application of pressure. The density/particle size matrix was set up as in above evaluations, however each combination also compared a non perforated sample versus a perforated sample. Surface absorption of oil was measured in grams absorbed in 15 minutes. The following table summarizes the results.

TABLE 5

| Density (pcf) | Particle Size | Perforations (Yes/No) | 15 Min. Oil Saturation Capacity (gms absorbed) |
|---|---|---|---|
| 20 | +8 | Yes | 50.1 |
| 20 | +8 | No | 18.6 |
| 30 | +8 | Yes | 15.8 |
| 30 | +8 | No | 4.3 |
| 20 | −8 | Yes | 47.3 |
| 20 | −8 | No | 18.3 |
| 30 | −8 | Yes | 11.5 |
| 30 | −8 | No | 2.4 |
| 20 | −2 | Yes | 63.9 |
| 20 | −2 | No | 42.1 |
| 30 | −2 | Yes | 17.7 |
| 30 | −2 | No | 4.3 |
| 40 | −8 | Yes | 2.6 |
| 40 | −8 | No | 1.4 |

All samples showed an increased oil absorption with the additions of perforations to the surface of the panel, however there was a significant increase in oil absorption with the 30 pcf panels regardless of particle size.

Additionally, the saturated panels did not exhibit any leaching or dripping of liquid when lifted from the supporting surface, in either a vertical or horizontal position. When these panels were compared with oil absorbent mats known in the art, such as polypropylene mats or wood fiber mats, it was found that when each of these panels and mats were vertically suspended for identical periods of time, the corn residue panel did not leach any oil. However, the polypropylene mat lost between about 20% to about 30% of the oil volume absorbed at saturation and the wood fiber mat lost between about 30% to about 40% of the oil volume absorbed at saturation. Further, when 50 pounds of pressure per square inch was applied to the corn residue panel, the polypropylene mat and the wood fiber mat after oil was absorbed until saturation, it was observed that the corn residue panel retained all of the oil absorbed while oil was squeezed out in both the polypropylene mat and the wood fiber mat.

EXAMPLE 2

The corn residue is also capable of processing into an environmentally safe mat material which can be formed into nursery pots for direct transplantation into soil for landscaping or other planting purposes. The adhesive utilized in this example is a natural adhesive, preferably a starch-based resins. Specifically, a corn starch-water resin was utilized in the present example.

The corn residue material was prepared from a five foot corn stalk segment, wherein the stalk was reduced to particles approximately 1 inch in length or less. The stalk was first chopped in a Hamilton Beach Blender/Model 629. The speed was then increased from chop to mix then to liquefy for a total blend time of approximately 5 minutes. The adhesive was prepared by mixing 1 part corn starch with 19 parts water and boiled for approximately 5 minutes, or until a glue-type consistency was achieved.

The mat material was prepared by combining approximately the corn residue particles with approximately 2.3% by weight of the corn starch-water paste and mixed until a pliable blend was achieved. The blend was then molded into a bowl or pot shape and held at approximately 350 deg. F. for about 25 minutes. After cooling, the pot was sturdy and capable of containing a plant and soil.

This invention has been described herein in considerable detail in order to comply with the Patent Statutes and to provide those skilled in the art with the information needed to apply the novel principles and to construct and use such specialized components as are required. However, while particular embodiments of the present invention have been described herein in detail, it is to be understood that various alternations, modifications and substitutions can be made therein without departing from the spirit and scope of the present invention, as defined in the claims which follow. For example, one skilled in the art will appreciate that the foregoing embodiments are capable of being produced from other agriculture residues, such as wheat straw, rye straw, barley straw, prairie grasses, alfalfa straw, flax straw and combinations thereof.

We claim:

1. A process for producing a rigid absorbent panel from an agriculture residue material and an adhesive, comprising the steps of:
   (a) reducing the agriculture residue material to form particles of a predetermined size;
   (b) admixing the adhesive to the particles, wherein the adhesive is present in an amount sufficient to form a pliable blend of the agricultural residue material and the adhesive;
   (c) forming a mass of particles from the pliable blend; and
   (d) subjecting the mass of particles to a predetermined pressure per square inch and an elevated temperature for a pre-determined period of the to cure the adhesive and to form a rigid panel of desired thickness capable of withstanding varied loads and having a modulus of rupture of at least about 60 psi or greater, a modulus of elasticity of approximately 16,500 psi or greater and a density of approximately 40 pcf or less;

wherein said absorbent panel has oil absorbing properties, strength, low density, is hard and rigid, and has essentially no thickness swell with oil absorption.

2. The process of claim 1 wherein the agriculture residue material is selected from a group consisting of: corn residue, wheat straw, rye, barley, prairie grass, alfalfa straw, flax straw, and combinations thereof.

3. The process of claim 2 further comprising the step of classifying the reduced agriculture residue particles by passage through a number 2 screen and being retained by a number 150 screen prior to admixing the adhesive.

4. The process of claim 1 further comprising the step of:
   drying the particles of the agriculture residue material to a moisture content from between about 1% to about 10% prior to admixing the adhesive.

5. The process of claim 1, wherein the adhesive is added in an amount ranging from between about 2% to about 20% based on total dry weight of the agricultural residue material, wherein the adhesive is selected from a group consisting of: synthetic resins and natural resins.

6. The process of claim 5, wherein the adhesive is added in an amount between about 5% to about 8% based on total dry weight of the agricultural residue product, and wherein the adhesive is selected from a group consisting of: phenol-formaldehyde resins, phenol-resorcinol-formaldehyde resins, urea-formaldehyde resins, melamine resins, melamine-urea resins, polyvinyl resin emulsions, thermosetting polyvinyl acetate emulsions, polyurethane-based resins, isocyanate-based resins, acrylics, polyesters, and epoxy resins.

7. The process of claim 1 wherein the predetermined pressure is applied perpendicularly to the surface of the mass of particles, the predetermined pressure being about 500 pounds per square inch.

8. The process of claim 7 further comprising:
   heating the mass of particles at a temperature about 380 degrees Fahrenheit for the predetermined period of time; and
   reducing the pressure to about 100 pounds per square inch, and wherein the predetermined period of time ranges from about 10 minutes to about 20 minutes.

9. The process of claim 8 wherein the panel has a surface, and wherein the process further comprises the step of:
   applying a textured sheet to the surface of the panel, such that an irregular surface is produced on the panel.

10. An absorbent panel comprising:
    agricultural residue particles; and
    a cured adhesive mixed with the agricultural residue particles,
wherein the absorbent panel absorbs oil products, is hard and rigid, has essentially no thickness swell with oil absorption, has a density from between about 15 to about 40 pounds per cubic foot, has a modulus of rupture of at least about 60 psi or greater, and has a modulus of elasticity of approximately 16,500 psi or greater.

11. The absorbent panel of claim 10 wherein the agriculture residue material comprises approximately 90%–98% corn residue particles having a size less than about 1 inch.

12. The process of claim 1 wherein the mass of particles is subjected to an elevated temperature and pressure simultaneously.

13. The process of claim 12 wherein the mass of particles is subjected to an elevated temperature for between approximately 1 minute to 30 minutes to cure the adhesive to form a rigid panel having sufficient strength.

14. The process of claim 12 wherein the mass of particles is subjected to a pressure of approximately 500 psi for a predetermined period of time and subjected to a reduced pressure of 100 psi thereafter until the adhesive is cured to form a rigid panel having sufficient strength.

15. The process of claim 14 wherein the mass of particles is subjected to a pressure of approximately 500 psi for about 30 seconds and thereafter 100 psi until the adhesive is cured to form a rigid panel.

16. The process of claim 1 wherein the adhesive is cured at a temperature ranging between 300°–500° F.

17. The absorbing panel of claim 10 wherein the agricultural residue particles comprise about 80% to 95% and the adhesive comprises about 5% to 20%.

18. The absorbing panel of claim 10 wherein the adhesive comprises 1 to about 5 parts of a dry adhesive, and water at about 15 to about 19 parts relative to the dry adhesive.

* * * * *

UNITED STATES PATENT AND TRADEMARK OFFICE
CERTIFICATE OF CORRECTION

PATENT NO. :   5,891,937

DATED      :   Apr. 6, 1999

INVENTOR(S) :  Larry E. Berg, et al.

It is certified that error appears in the above-identified patent and that said Letters Patent is hereby corrected as shown below:

At Col. 8, line 3, please delete "the" following "of" and insert --time--.

Signed and Sealed this

Twenty-first Day of December, 1999

Attest:

Q. TODD DICKINSON

*Attesting Officer*         *Acting Commissioner of Patents and Trademarks*